United States Patent
Hsiang (10) Patent No.: US 9,689,519 B2
(45) Date of Patent: Jun. 27, 2017

(54) TRAMPOLINE SUPPORT STRUCTURE

(71) Applicant: Crowntec (Jiang Xi) Sports Technology Co. Ltd., Jiujiang, Jiangxi Province (CN)

(72) Inventor: Hua-Lu Hsiang, Taoyuan (TW)

(73) Assignee: CROWNTEC (JIANG XI) SPORTS TECHNOLOGY CO. LTD., Jiujiang, Jiangxi Province (CN)

( * ) Notice: Subject to any disclaimer, the term of this patent is extended or adjusted under 35 U.S.C. 154(b) by 79 days.

(21) Appl. No.: 14/882,957

(22) Filed: Oct. 14, 2015

(65) Prior Publication Data

US 2017/0108152 A1    Apr. 20, 2017

(51) Int. Cl.
    *F16L 41/02*    (2006.01)

(52) U.S. Cl.
    CPC .................. *F16L 41/021* (2013.01)

(58) Field of Classification Search
    CPC .................. A63B 5/11; F16L 41/021
    See application file for complete search history.

(56) References Cited

U.S. PATENT DOCUMENTS

2004/0091307 A1* 5/2004 James .............. B21C 37/296
                                                403/188

FOREIGN PATENT DOCUMENTS

| CN | 2806855 Y | 8/2006 |
|---|---|---|
| CN | 201250829 Y | 6/2009 |
| CN | 202237001 U | 5/2012 |

* cited by examiner

*Primary Examiner* — Loan H Thanh
*Assistant Examiner* — Rae Fischer
(74) *Attorney, Agent, or Firm* — Muncy, Geissler, Olds & Lowe, P.C.

(57) ABSTRACT

A trampoline support structure includes a manifold, a first annular tube, a mesh encircled tube, a second annular tube and a support tube. The manifold includes a longitudinal installation portion, a transverse installation portion and an installation hole located on the transverse installation portion. The first annular tube includes a first assembly section inserted into the transverse installation portion and an anchor hole located on the first assembly section. The mesh encircled tube includes an anchor section inserted into the installation hole, the anchor hole and the longitudinal installation portion. The second annular tube includes a second assembly section inserted into the first assembly section. The anchor section, the longitudinal installation portion and the support tube form a multi-layer structure, thus can solve the problem of inadequate structural strength occurred to the conventional techniques.

7 Claims, 10 Drawing Sheets

TRAMPOLINE SUPPORT STRUCTURE

FIELD OF THE INVENTION

The present invention relates to a trampoline support structure and particularly to a trampoline support structure that employs a plurality of tubes coupled with one another to enhance structural strength.

BACKGROUND OF THE INVENTION

A conventional trampoline generally includes a trampoline frame to support a jumping mesh. The trampoline frame is constructed by assembling a plurality of support means. For instance, China patent No. CN2806855 discloses an improved weldless connection apparatus that includes a transverse connection tube and a longitudinal connection tube that cross each other to form a T-shaped structure. The transverse connection tube includes two opposing walls each includes an anchor hole formed thereon. During implementation a plurality of the weldless connection apparatus are connected to a trampoline frame, then a plurality of springs are connected to a rebounding surface located in the trampoline frame. The trampoline frame consists of a plurality of arched tubes. The transverse connection tube is inserted by two arched tubes. One of the arched tubes further passes through another arched tube. The two arched tubes include respectively a hole corresponding to the anchor hole that are fastened together via a connector to anchor any two arched tubes of the trampoline frame without falling apart due to stretching of the rebounding surface and the springs.

However, when users are jumping on the rebounding surface on jumping exercise, because there is no any protection measure around the trampoline frame, the users could rebound outside the trampoline frame and fall to the floor. To remedy such a problem Applicant has proposed an improvement of adding a protection encircled mesh disclosed in China patent No. CN202237001. It is a trampoline equipped with a protection encircled mesh. The trampoline includes a frame, a jumping portion, a reinforced connection portion and a protection encircled mesh. The frame includes an annular base rack, a plurality of support racks installed on the annular base rack and an encircled mesh support rack assembly installed on the support racks. The protection encircled mesh is connected to an inner side of the encircled mesh support rack assembly. Through the protection encircled mesh users can be protected from falling outside of the trampoline during rebounding from the jumping portion.

However, on CN202237001 the encircled mesh support rack assembly is anchored on the outer side of the support racks through screw fastening. The encircled mesh support rack assembly still is prone to loosening from the support racks due to stress or other factors generated by jumping of the users. To resolve the aforesaid problem another China patent No. CN201250829 discloses a trampoline frame tube connection structure which includes two frame tubes, a leg tube, a protection fence tube and a connection element. The connection element includes a longitudinal tube, a transverse tube welded to the longitudinal tube, a reinforced tube located in the transverse tube and exposed outside thereof, and a fastening hole located on the transverse tube communicating with the reinforced tube. During implementation of the trampoline frame tube connection structure the two frame tubes inserted into two opposing sides of the transverse tube, the protection fence tube runs through the reinforced tube, and the fastening hole is screwed via a screw to fasten the frame tubes and the protection fences tube, thereby enhance the structural strength between the protection fence tube and the connection element from loosening caused by shaking and vibration of the trampoline.

However, on CN201250829, although the trampoline frame connection structure has tried to overcome the loosening problem through mutual fastening of the transverse tube, the frame tube and the protection fence tube, the two frame tubes merely are supported by the transverse tube without one frame tube passing through another frame tube, and the leg tube and the protection fence tube also do not couple with each other. As a result, the two frame tubes, the leg tube and the protection fence tube are easily bent due to vibration of the trampoline or during transportation. In addition, because the transverse tube, the frame tube and the protection fence tube are fastened via a screw, the screw could fracture when subject to excessive stress during jumping and rebounding process of the users. Hence how to design a support structure to overcome the problem of inadequate structural strength that occurs to the conventional techniques is an issue yet to be resolved

SUMMARY OF THE INVENTION

The primary object of the present invention is to solve the problem of structural strength deficiency of the conventional techniques.

To achieve the foregoing object the present invention provides a trampoline support structure that includes a manifold, a first annular tube, a mesh encircled tube, a second annular tube and a support tube. The manifold includes a longitudinal installation portion and a transverse installation portion that are formed integrally and an installation hole located on the transverse installation portion and extended in the direction of the longitudinal installation portion. The first annular tube is assembled on the manifold and includes a first assembly section inserted into the transverse installation portion, a first connection section extended from the first assembly section for installation of a jumping assembly and an anchor hole located on the first assembly section and opposed the installation hole when the first assembly section is inserted into the transverse installation portion. The mesh encircled tube is coupled on the manifold to support a protection encircled mesh. The mesh encircled tube includes an anchor section inserted into the installation hole and the anchor hole and extended into the longitudinal installation portion and an extended section extended from the anchor section for assembly of the protection encircled mesh. The second annular tube includes a second assembly section inserted into the first assembly section and a second connection section extended from the second assembly section for installation of the jumping assembly. The support tube is coupled on the longitudinal installation portion and butts a plane to form a buffer space between the jumping assembly and the plane.

In one embodiment the manifold includes a buffer gap located on the transverse installation portion and extended in the direction of the longitudinal installation portion, and the longitudinal installation portion has a preassembly state without compressing the buffer gap and an assembly state coupled with the support tube to compress the buffer gap.

In another embodiment the manifold is formed by folding a plate in half.

In yet another embodiment the manifold includes at least one protrudent portion located on the longitudinal installation portion at one side of the buffer gap and an indented portion located at another side of the buffer gap facing the protrudent portion.

In yet another embodiment the manifold includes at least one first anchor hole located on the longitudinal installation portion, and the mesh encircled tube includes at least one second anchor hole located on the anchor section corresponding to the first anchor hole. The support tube includes at least one third anchor hole located coaxially with the first anchor hole and the second hole on a same axis after assembly to allow a fastener to run through in sequence thereof. Furthermore, one of the first, second and third anchor holes is elliptic.

In yet another embodiment the manifold includes a first detent wall surrounding the installation hole to aid support of the extended section.

In yet another embodiment the first annular tube includes a second detent wall surrounding the anchor hole to aid support of the anchor section.

In yet another embodiment the transverse installation portion, the first assembly section and the second assembly section are formed respectively at a tubular diameter such that the transverse installation portion is greater than the first assembly section which is greater than the second assembly section.

In yet another embodiment the manifold is a T-shaped tube.

Through the structure set forth above, the invention, compared with the conventional techniques, can provide advantageous features as follows:

By passing the second assembly section through the first assembly section the second annular tube can be anchored on the first annular tube. With the mesh encircled tube inserted into the installation hole, the anchor hole and the longitudinal installation portion, the mesh encircled tube can anchor the second annular tube on the longitudinal installation portion. With the support tube coupled on the longitudinal installation portion the anchor section, the longitudinal installation portion and the support tube form a multi-layer tubular structure, hence can solve the problem of inadequate structural strength happened to the conventional techniques.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
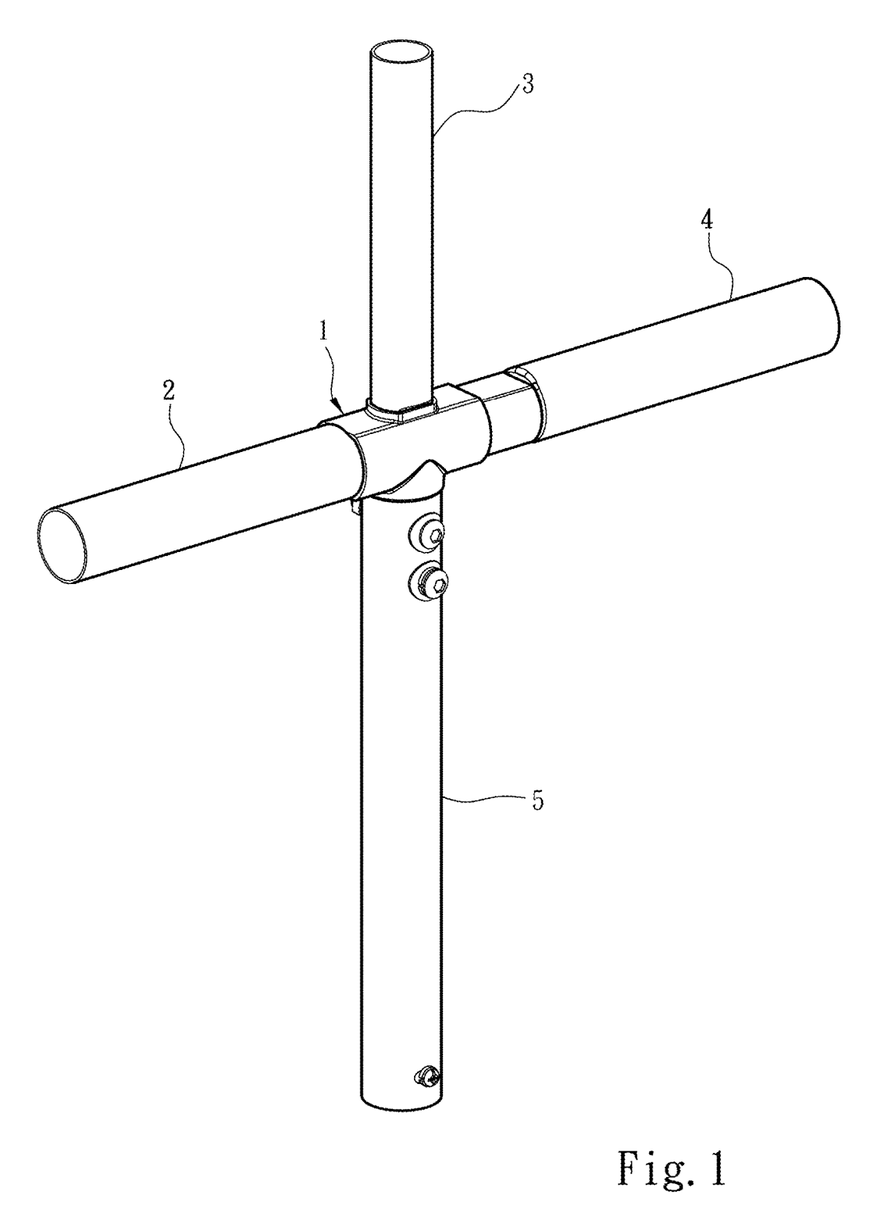
FIG. 1 is a schematic view of the structure of an embodiment of the invention.

Please referring to FIG. 1, the present invention aims to provide a trampoline support structure that includes a manifold 1, a first annular tube 2, a mesh encircled tube 3, a second annular tube 4 and a support tube 5. Please also referring to FIG. 2, the manifold 1 includes a longitudinal installation portion 11 and a transverse installation portion 12 that are integrally formed and communicate with each other, and an installation hole 13 located on the transverse installation portion 12 and extended toward the longitudinal installation portion 11. The manifold 1 is a T-shaped tube. The first annular tube 2 includes a first assembly section 21, a first connection section 22 extended from the first assembly section 21 and an anchor hole 23 located on the first assembly section 21. The mesh encircled tube 3 includes an anchor section 31 and an extended section 32 extended from the anchor section 31. The second annular tube 4 includes a second assembly section 41 and a second connection section 42 extended from the second assembly section 41.

Figure 3:
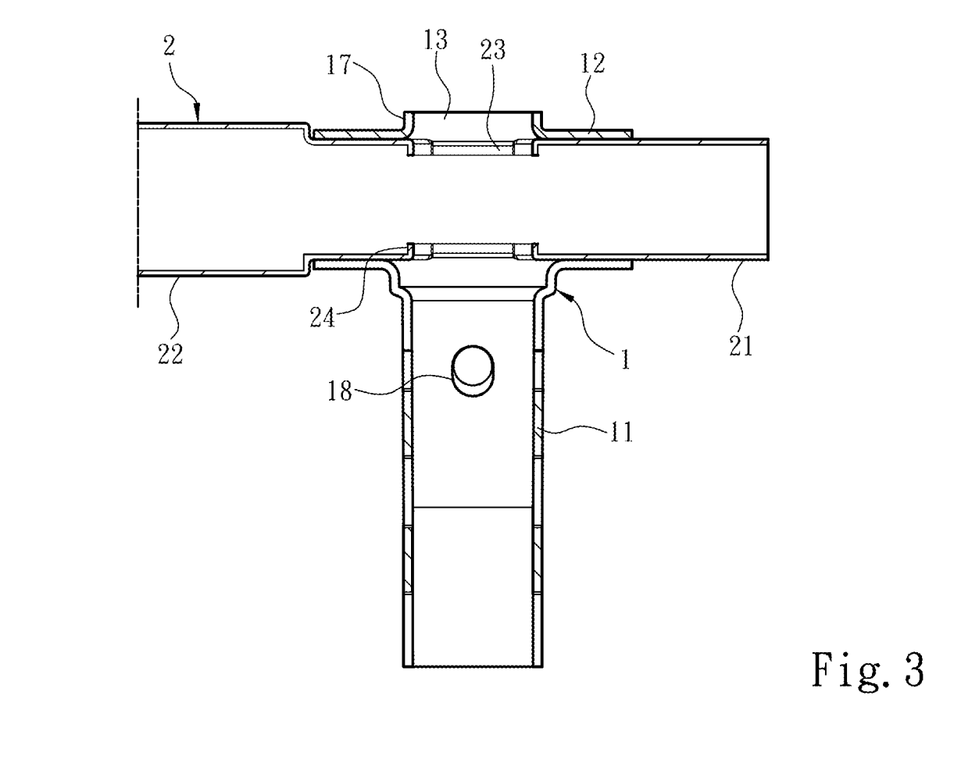
FIG. 3 is a schematic view of an embodiment of the invention in assembly condition-1.

Please referring to FIGS. 3 through 6, for assembly of the support structure, first, as shown in FIG. 3, the first assembly section 21 inserted into the transverse installation portion 12 with the anchor hole 23 aligned with the installation hole 13; namely the installation hole 13, the anchor hole 23 and the longitudinal installation portion 11 are coaxial on a same axis. Next, referring to FIG. 4, includes the anchor section 31 inserted into the installation hole 13, the anchor hole 23 and extended into the longitudinal installation portion 11 with the first assembly section 21 anchored in the transverse installation portion 12. Then, referring to FIG. 5, includes the second assembly section inserted into the first assembly section 21. Finally, referring to FIG. 6, couple the support tube 5 on the longitudinal installation portion 11. In addition, the longitudinal installation portion 11 has a tubular diameter smaller than that of the support tube 5. More specifically, the longitudinal installation portion 11 is coupled on an outer side of the anchor section 31, and the support tube 5 is coupled on the longitudinal installation portion 11. Therefore a multi-layer structure is formed to enhance the structural structure among the first annular tube, 2, the mesh encircled tube 3, the second annular tube 4 and the support tube 5, thus finished the assembly of the invention.

Figure 4:
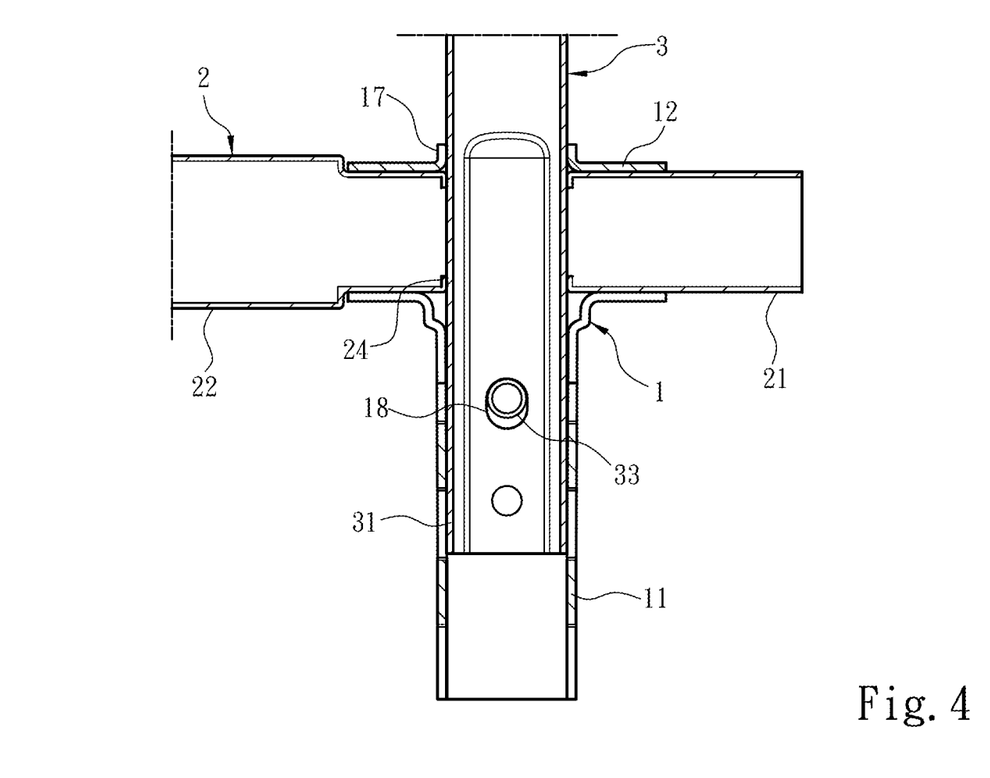
FIG. 4 is a schematic view of an embodiment of the invention in assembly condition-2.
Figure 5:
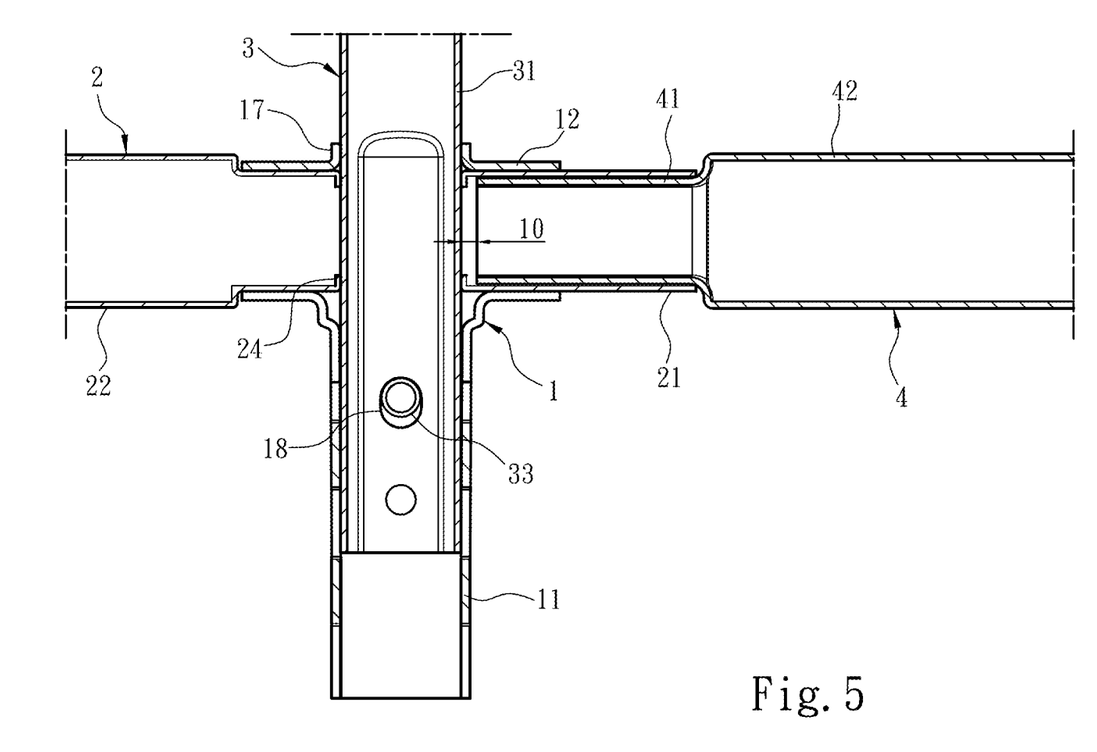
FIG. 5 is a schematic view of an embodiment of the invention in assembly condition-3.

The first connection section 22 can have an outer diameter greater than that of the first assembly section 21. The first assembly section 21 is formed by extending the first connection section 22 in a gradually expanded manner or formed a step difference therewith. When the first assembly section 21 is inserted into the transverse installation portion 12 the first connection section 22 butts the perimeter of one side of the transverse installation portion 12. On the other hand, the extended section 32 also has an outer diameter greater than that of the anchor section 31 and is formed by extending the anchor section 31 in a gradually expanded manner or formed a step surface therewith. When the anchor section 31 is inserted into the installation hole 13, the anchor hole 23 and the longitudinal installation portion 11, the extended section 32 butts the rim of the installation hole 13. In addition, the second connection section 42 can have an outer diameter greater than that of the second assembly section 41 and be formed by extending the second assembly section 41 in a gradually expanded manner or formed a step surface therewith. When the second assembly section 41 is inserted into the first assembly section 21 the second connection section 42 butts the perimeter of the first assembly section 21.

Moreover, the anchor section 31 can be a tube with a coupling plane, and the installation hole 13 and the anchor hole 23 are respectively a square hole with a round angle so that after the anchor section 31 is inserted into the installation hole 13 and the anchor hole 23 it is not turnable. In addition, the transverse installation portion 12 is formed at a tubular diameter greater than that of the first assembly section 21, and the first assembly section 21 is formed at a tubular diameter greater than that of the second assembly section 41, and the transverse installation portion 12, the first assembly section 21 and the second assembly section 41 are respectively a square hole with a round angle so that after the first assembly section 21 is inserted into the transverse installation portion 12 it is not turnable, and after the second assembly section 41 is inserted into the first assembly section 21 it also is not turnable.

Figure 8:
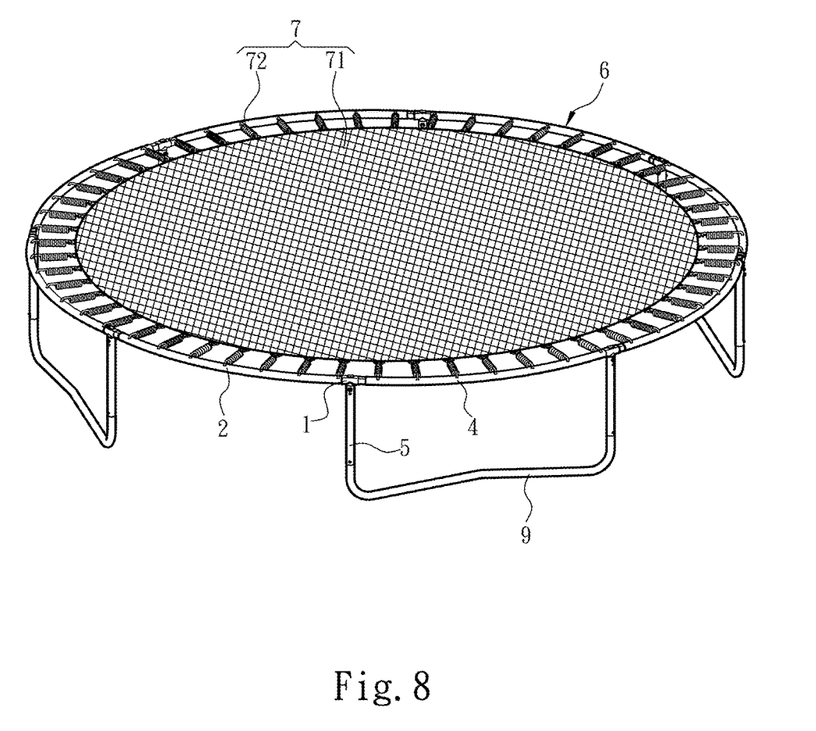
FIG. 8 is a perspective view of an embodiment of the invention adopted on a trampoline.
Figure 9:
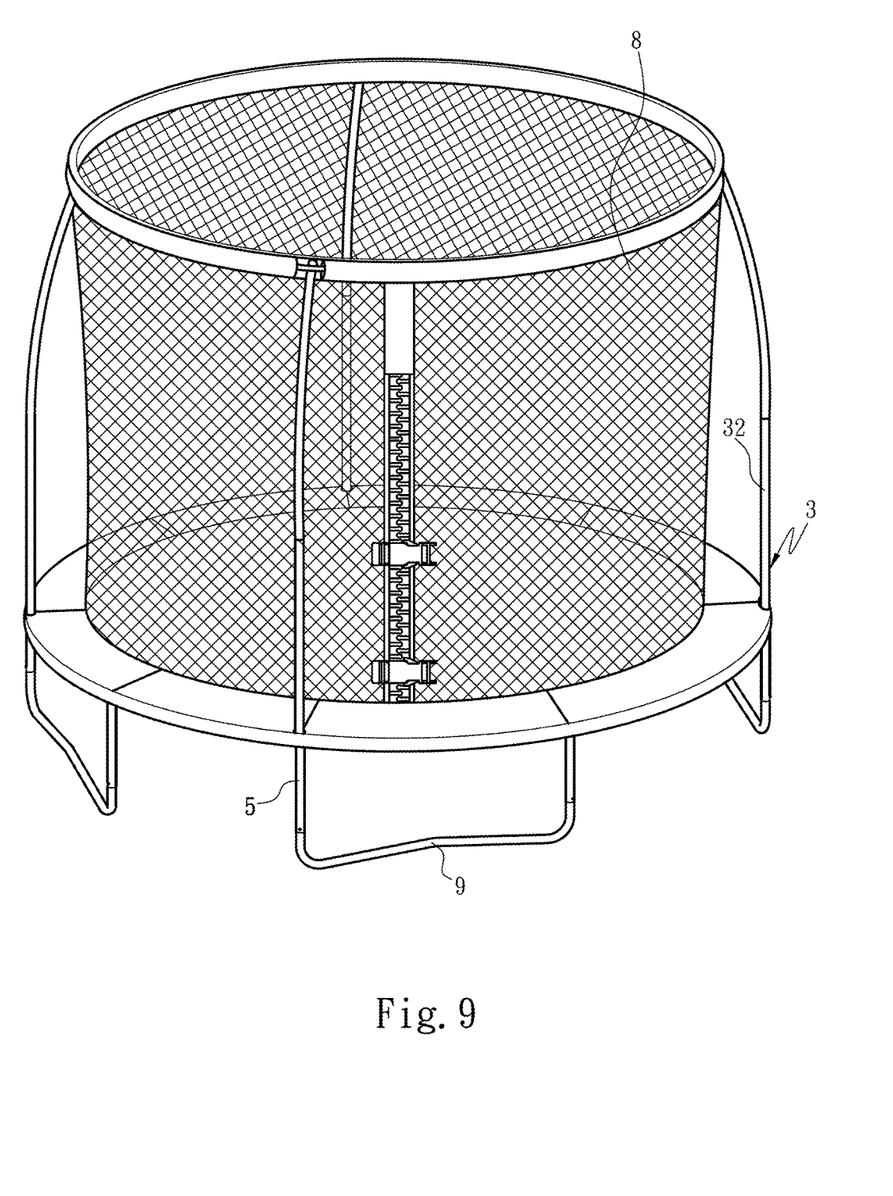
FIG. 9 is a perspective view of an embodiment of the invention adopted on another trampoline.

Please referring to FIGS. 8 and 9, to construct a trampoline through the invention, first provide a plurality of the support structure to assemble a trampoline frame 6; next, install a jumping assembly 7 and a protection encircled mesh 8. More specifically, couple the first annular tubes 2 and the second annular tubes 4 in an annular manner. The jumping assembly 7 includes a rebounding plane 71 and a plurality of elastic elements 72 (such as springs) installed on the circumference of the rebounding plane 71. The elastic elements 72 are connected to the first annular tubes 2 and the second annular tubes 4 to stretch the rebounding plane 71 on the inner side of the first annular tubes 2 and the second annular tubes 4. On the other hand, the support tube 5 butts a plane (not shown in the drawings) to allow the jumping assembly 7 and the plane to form a buffer space (also not shown in the drawings) between them. In addition, two neighboring support tubes 5 have their bottom connected to a leg 9 to increase the force receiving area of the bottom of the trampoline. Furthermore, the mesh encircled tubes 3 are extended upward from the rebounding plane 71, and the protection encircled mesh 8 is installed on an inner side of the mesh encircled tubes 3 around the upper zone of the rebounding plane 71.

When a user jumps on the rebounding plane 71 the elastic elements 72 are stretched by the rebounding plane 71 to generate deformation of extension and retraction. The first annular tubes 2 and the second annular tubes 4 provide a support force to the jumping assembly 7 to allow the user to maintain continuous jumping and rebounding on the rebounding plane 71. In addition, through the protection encircled mesh 8 surrounding the user the user can be prevented from rebounding outside the trampoline frame 6. In addition, through the second assembly section 41 inserted into the first assembly section 21 to anchor the first annular tube 2 on the second annular tube 4, and through the mesh encircled tube 3 inserted into the installation hole 13, the anchor hole 23 and the longitudinal installation portion 11 to anchor the second annular tube 4 on the manifold 1, and with the support tube 5 coupled on the longitudinal installation portion 11, the anchor section 31, the longitudinal installation portion 11 and the support tube 5 form a multi-layer tubular structure, thus can solve the problem of inadequate support strength occurred to the conventional structures.

In addition, due to the longitudinal installation portion 11 and the transverse installation portion 12 are formed in an integrated manner, and the first annular tube 2, the mesh encircled tube 3, the second annular tube 4 and the support tube 5 are inserted and anchored on the longitudinal installation portion 11 and the transverse installation portion 12 rather than by welding, the manifold 1 can enhance the total assembly strength of the support structure of the trampoline, thereby also can resolve the problem of bending, separation or fracturing caused by prolonged stretching of the springs that might otherwise take place on the trampoline structure constructed by welding to anchor the mesh encircled tube.

Figure 6:
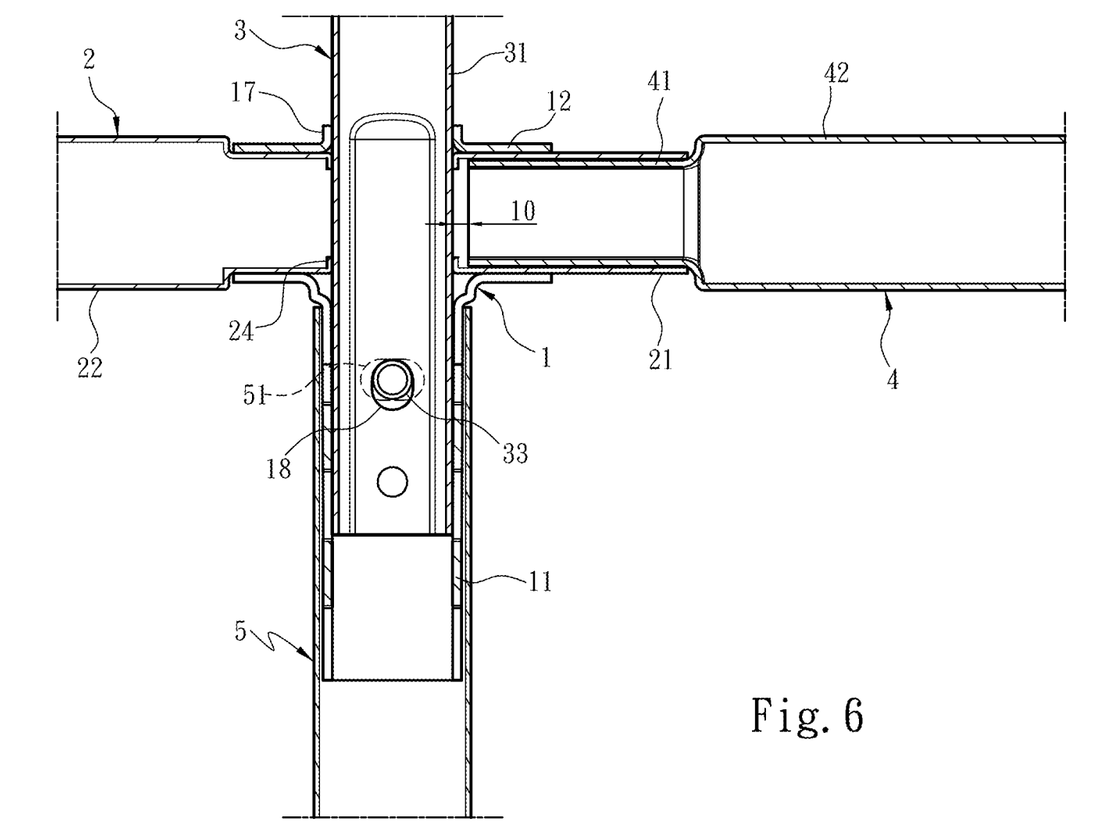
FIG. 6 is a schematic view of an embodiment of the invention in assembly condition-4.
Figure 7:
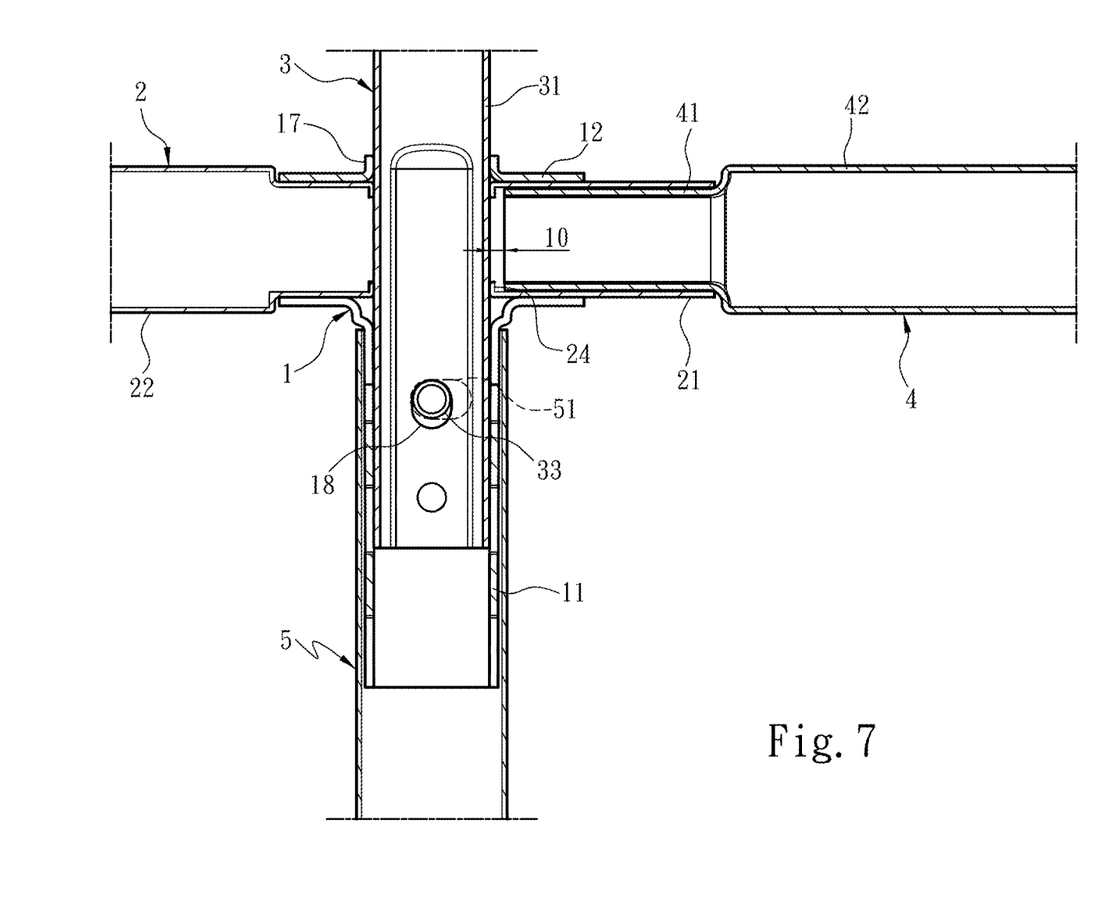
FIG. 7 is a schematic view of an embodiment of the invention in assembly condition-5.

More specifically, please referring to FIGS. 5 through 7, the second assembly section 41 is spaced from the anchor section 31 of the mesh encircled tube 3 at a distance 10, namely, the second annular tube 4 does not touch the mesh encircled tube 3 during assembly, thereby can prevent the second assembly section 41 from hitting the anchor section 31 while the user is jumping and rebounding on the rebounding plane 71.

Figure 2:
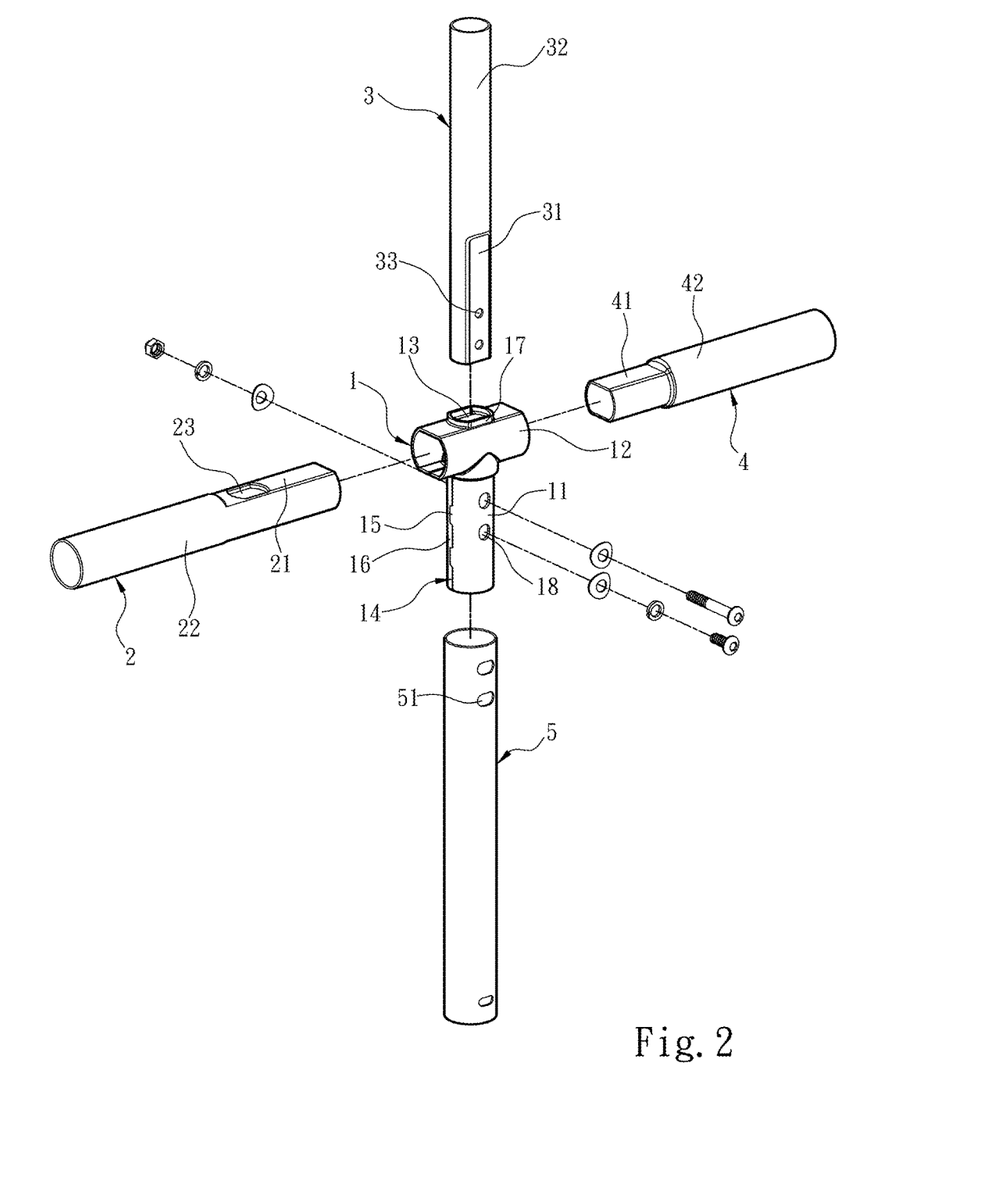
FIG. 2 is an exploded view of an embodiment of the invention.
Figure 10:
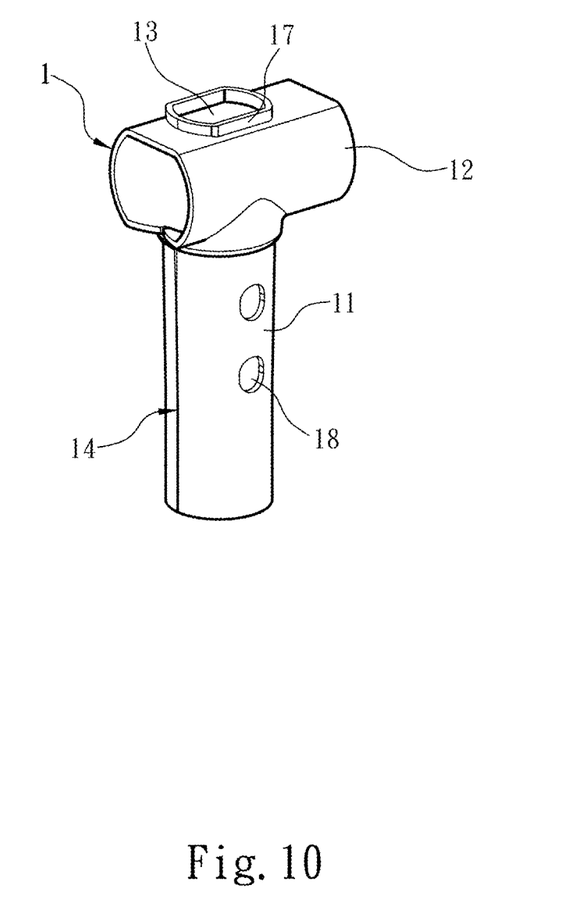
FIG. 10 is a schematic view of the structure of another embodiment of the invention.

Please referring to FIGS. 2 and 10, in one embodiment, as shown in FIG. 2, the longitudinal installation portion 11 is located at a middle spot of the transverse installation portion 12. In another embodiment, as shown in FIG. 10, the longitudinal installation portion 11 is located away from the middle spot of the transverse installation portion 12. In addition, one side of the transverse installation portion 12 to receive insertion of the first assembly section 21 can use less material to reduce fabrication cost of the manifold 1.

Please referring to FIG. 2 again, in yet another embodiment the manifold 1 includes a buffer gap 14 formed on the transverse installation portion 12 in the extended direction of the longitudinal installation portion 11. In this embodiment the manifold 1 is formed by folding a plate in half to form the buffer gap 14 on the transverse installation portion 12. Thus the longitudinal installation portion 11 has a preassembly state without compressing the buffer gap 14 and an assembly state with the support tube 5 coupled to compressing the buffer gap 14. When the support tube 5 is coupled on the longitudinal installation portion 11 at the assembly state the buffer gap 14 is compressed by an external force, but is relieved after assembly is finished, and is compacted in the support tube 5 to increase total strength of the support structure of the trampoline. Furthermore, the manifold 1 further includes at least one protrudent portion 15 located on the longitudinal installation portion 11 at one side of the buffer gap 14 and an indented portion 16 located at another side of the buffer gap 14 facing the protrudent portion 15, and when the support tube 5 is coupled on the longitudinal installation portion 11 and compresses the buffer gap 14 the protrudent portion 15 and the indented portion 16 are wedged together to further enhance the structural strength of the invention.

Please referring to FIGS. 2 and 4, in yet another embodiment the manifold 1 further includes a first detent wall 17 located annularly about the installation hole 13 to aid support of the extended section 32. On the other hand, the first annular tube 2 also includes a second detent wall 24 located annularly about the anchor hole 23 to aid support of the anchor section 31. More specifically, the first detent wall 17 is jutting outward to aid support of the extended section 32, while the second detent wall 24 is jutting inward to aid support of the anchor section 31, thereby can increase the support area of the mesh encircled tube 3 to reduce swaying thereof caused by shaking and vibration of the trampoline. Namely, the first detent wall 17 and the second detent wall 24 can enhance the structural strength among the transverse installation portion 12, the first assembly section 21 and the anchor section 31, and also provide firmer support for the support structure of the trampoline to enhance its steadiness when in use.

Please referring to FIGS. 6 and 7, in yet another embodiment the manifold 1 includes at least one first anchor hole 18 located on the longitudinal installation portion 11, and the mesh encircled tube 3 includes at least one second anchor hole 33 on the anchor section 31 corresponding to the first anchor hole 18, and the support tube 5 includes at least one third anchor hole 51. After the support tube 5 is coupled on the longitudinal installation portion 11 the first anchor hole 18, the second anchor hole 33 and the third anchor hole 51 are located coaxially on a same axis to allow a fastener to run sequentially through the first anchor hole 18, the second anchor hole 33 and the third anchor hole 51. In addition, one of the first anchor hole 18, the second anchor hole 33 and the third anchor hole 51 is elliptic so that the longitudinal installation portion 11, the mesh encircled tube 3 or the support tube 5 can be adjusted in position during implementation of the support structure of the trampoline to facilitate installation of the support structure.

As a conclusion, the trampoline support structure of the invention includes a manifold, a first annular tube, a mesh encircled tube, a second annular tube and a support tube. The manifold includes a longitudinal installation portion, a transverse installation portion and an installation hole located on the transverse installation portion. The first annular tube includes a first assembly section inserted into the transverse installation portion and an anchor hole located on the first assembly section. The mesh encircled tube includes an anchor section inserted into the installation hole, the anchor hole and the longitudinal installation portion. The second annular tube includes a second assembly section inserted into the first assembly section. The support tube is coupled on the longitudinal installation portion and coupled with the first annular tube through the second annular tube. The mesh encircled tube is anchored on the transverse installation portion and the first annular tube. The anchor section, the longitudinal installation and the support tube form a multi-layer tubular structure, hence can solve the problem of inadequate structural strength occurred to the conventional techniques.

What is claimed is:

1. A trampoline support structure to construct a trampoline frame to allow a jumping assembly and a protection encircled mesh to be installed thereon, comprising:
   a manifold including a longitudinal installation portion and a transverse installation portion that are integrally formed and an installation hole defined by sides that extend away from the longitudinal installation portion;
   a first annular tube which is assembled on the manifold and includes a first assembly section inserted into the transverse installation portion, a first connection section extended from the first assembly section for installation of the jumping assembly and an anchor hole located on the first assembly section and opposed the installation hole when the first assembly section is inserted into the transverse installation portion;
   a mesh encircled tube which is assembled on the manifold to support the protection encircled mesh and includes an anchor section inserted into the installation hole and the anchor hole and extended into the longitudinal installation portion and an extended section extended from the anchor section for installation of the protection encircled mesh;
   a second annular tube including a second assembly section 25 inserted into the first assembly section and a second connection section extended from the second assembly section for installation of the jumping assembly; and
   a support tube coupled on the longitudinal installation portion and butted a plane to form a buffer space between the jumping assembly and the plane,
   wherein the manifold includes a buffer gap located on the transverse installation portion and extended in the direction of the longitudinal installation portion, the longitudinal installation portion including a preassembly state without compressing the buffer gap and an assembly state coupled with the support tube to compress the buffer gap,
   wherein the manifold is formed by folding a plate in half, and
   wherein the manifold includes a protruding portion on the longitudinal installation portion at one side of the buffer gap and an indented portion opposing the protruding portion at another side of the buffer gap to face the protruding portion.

2. The trampoline support structure of claim 1, wherein the manifold includes at least one first anchor hole located on the longitudinal installation portion, the mesh encircled tube including at least one second anchor hole located on the anchor section corresponding to the first anchor hole, the support tube including at least one third anchor hole coaxial with the first anchor hole and the second anchor hole on a same axis after assembly to allow a fastener to run through sequentially.

3. The trampoline support structure of claim 2, wherein one of the first anchor hole, the second anchor hole and the third anchor hole is elliptic.

4. The trampoline support structure of claim 1, wherein the manifold includes a first detent wall encircled the installation hole to aid support of the extended section.

5. The trampoline support structure of claim 1, wherein the first annular tube includes a second detent wall encircled the anchor hole to aid support of the anchor section.

6. The trampoline support structure of claim 1, wherein the transverse installation portion, the first assembly section and the second assembly section are formed at diameters in such a fashion that the transverse installation portion is greater than the first assembly section which is further greater than the second assembly section.

7. The trampoline support structure of claim 1, wherein the manifold is a T-shaped tube.

* * * * *

(12) EX PARTE REEXAMINATION CERTIFICATE (11690th)
United States Patent
Hsiang

(10) Number: US 9,689,519 C1
(45) Certificate Issued: Jun. 22, 2020

(54) TRAMPOLINE SUPPORT STRUCTURE

(71) Applicant: Crowntec (Jiang Xi) Sports Technology Co. Ltd., Jiujiang, Jiangxi Province (CN)

(72) Inventor: Hua-Lu Hsiang, Taoyuan (TW)

(73) Assignee: CROWNTEC (JIANG XI) SPORTS TECHNOLOGY CO. LTD., Gongqingcheng, Jiujiang, Jiangxi Province (CN)

Reexamination Request:
No. 90/014,387, Oct. 8, 2019

Reexamination Certificate for:
Patent No.: 9,689,519
Issued: Jun. 27, 2017
Appl. No.: 14/882,957
Filed: Oct. 14, 2015

(51) Int. Cl.
*F16L 41/02* (2006.01)
*F16B 7/18* (2006.01)
*A63B 5/11* (2006.01)
*F16D 1/00* (2006.01)
*A63B 71/02* (2006.01)

(52) U.S. Cl.
CPC .............. *F16L 41/021* (2013.01); *A63B 5/11* (2013.01); *F16B 7/185* (2013.01); *F16D 1/00* (2013.01); *A63B 71/022* (2013.01); *A63B 2225/093* (2013.01)

(58) Field of Classification Search
None
See application file for complete search history.

(56) References Cited

To view the complete listing of prior art documents cited during the proceeding for Reexamination Control Number 90/014,387, please refer to the USPTO's public Patent Application Information Retrieval (PAIR) system under the Display References tab.

*Primary Examiner* — Russell D Stormer

(57) ABSTRACT

A trampoline support structure includes a manifold, a first annular tube, a mesh encircled tube, a second annular tube and a support tube. The manifold includes a longitudinal installation portion, a transverse installation portion and an installation hole located on the transverse installation portion. The first annular tube includes a first assembly section inserted into the transverse installation portion and an anchor hole located on the first assembly section. The mesh encircled tube includes an anchor section inserted into the installation hole, the anchor hole and the longitudinal installation portion. The second annular tube includes a second assembly section inserted into the first assembly section. The anchor section, the longitudinal installation portion and the support tube form a multi-layer structure, thus can solve the problem of inadequate structural strength occurred to the conventional techniques.

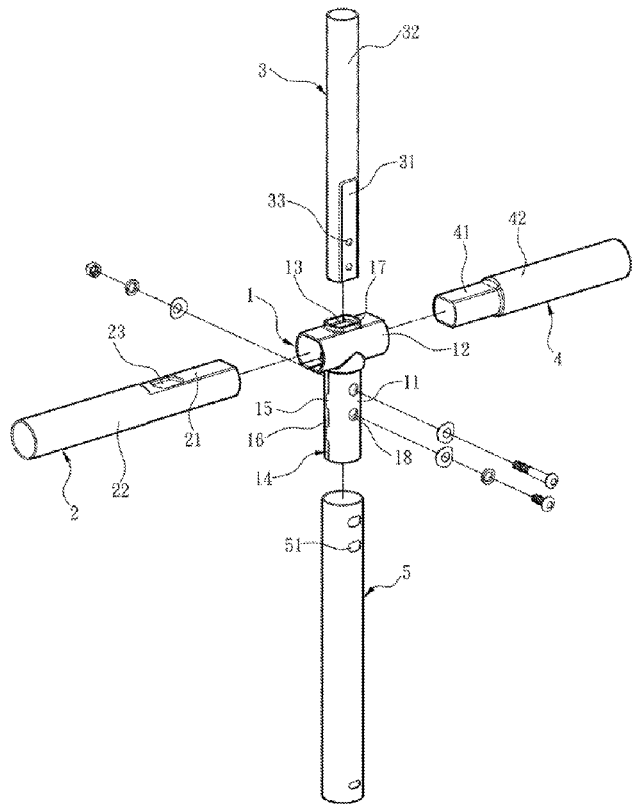

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-7, dependent on an amended claim, are determined to be patentable.

1. A trampoline support structure to construct a trampoline frame to allow a jumping assembly and a protection encircled mesh to be installed thereon, comprising:
    a manifold including a longitudinal installation portion and a transverse installation portion that are integrally formed and an installation hole defined by sides that extends away from the longitudinal installation portion;
    a first annular tube which is assembled on the manifold and includes a first assembly section inserted into the transverse installation portion, a first connection section extended from the first assembly section for installation of the jumping assembly and an anchor hole located on the first assembly section and opposed the installation hole when the first assembly section is inserted into the transverse installation portion;
    a mesh encircled tube which is assembled on the manifold to support the protection encircled mesh and includes an anchor section inserted into the installation hole and the anchor hole and extended into the longitudinal installation portion and an extended section extended from the anchor section for installation of the protection encircled mesh;
    a second annular tube including a second assembly section [25] inserted into the first assembly section and a second connection section extended from the second assembly section for installation of the jumping assembly, *wherein the second assembly section of the second annular tube is not penetrated by the anchor section of the mesh encircled tube;* and
    a support tube coupled on the longitudinal installation portion and butted a plane to form a buffer space between the jumping assembly and the plane;
    wherein the manifold includes a buffer gap located on the transverse installation portion and extended in the direction of the longitudinal installation portion, the longitudinal installation portion including a preassembly state without compressing the buffer gap and an assembly state coupled with the support tube to compress the buffer gap,
    wherein the manifold is formed by folding a plate in half, and
    wherein the manifold includes a protruding portion on the longitudinal installation portion at one side of the buffer gap and an indented portion opposing the protruding portion at another side of the buffer gap to face the protruding portion.

\* \* \* \* \*